US007400225B2

(12) United States Patent
Shea

(10) Patent No.: US 7,400,225 B2
(45) Date of Patent: Jul. 15, 2008

(54) ELECTRICAL DISTRIBUTION DEVICE INCLUDING PROTECTION FOR OVERHEATING CONDITIONS

(75) Inventor: John J. Shea, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 344 days.

(21) Appl. No.: 11/215,268

(22) Filed: Aug. 30, 2005

(65) Prior Publication Data

US 2007/0046418 A1 Mar. 1, 2007

(51) Int. Cl.
*H01H 37/76* (2006.01)
*H02H 5/04* (2006.01)

(52) U.S. Cl. ....................... 337/147; 337/142; 337/206; 337/401; 337/407

(58) Field of Classification Search ................. 337/401, 337/142, 147, 404, 405, 407, 206
See application file for complete search history.

(56) References Cited

U.S. PATENT DOCUMENTS

| | | | | | |
|---|---|---|---|---|---|
| 530,430 | A | * | 12/1894 | Klein | 337/403 |
| 921,875 | A | * | 5/1909 | Newman | 337/405 |
| 2,790,049 | A | * | 4/1957 | McAlister | 337/405 |
| 3,420,217 | A | * | 1/1969 | Powell et al. | 123/198 D |
| 3,638,083 | A | * | 1/1972 | Dornfeld et al. | 361/321.1 |
| 3,678,430 | A | * | 7/1972 | Gaia | 337/159 |
| 3,720,899 | A | | 3/1973 | Hire et al. | |
| 3,735,312 | A | * | 5/1973 | Nagel | 337/164 |
| 3,780,327 | A | * | 12/1973 | Vervaart et al. | 313/151 |
| 4,047,143 | A | * | 9/1977 | Burden et al. | 337/239 |
| 4,058,784 | A | * | 11/1977 | Gaia | 337/164 |
| 4,383,236 | A | * | 5/1983 | Urani et al. | 337/403 |
| 4,441,093 | A | * | 4/1984 | Okazaki | 337/404 |
| 4,536,641 | A | * | 8/1985 | Chan | 219/253 |
| 4,593,262 | A | * | 6/1986 | Krueger | 337/163 |
| 5,192,937 | A | * | 3/1993 | Lee | 337/104 |
| 5,280,262 | A | * | 1/1994 | Fischer | 337/405 |
| 5,355,110 | A | * | 10/1994 | Ruggiero et al. | 337/165 |
| 5,363,083 | A | * | 11/1994 | Fischer | 337/407 |
| 5,600,295 | A | * | 2/1997 | Kaufmann | 337/405 |
| 5,612,662 | A | * | 3/1997 | Drekmeier et al. | 337/389 |
| 5,770,993 | A | * | 6/1998 | Miyazawa et al. | 337/160 |
| 5,793,274 | A | * | 8/1998 | Kelly et al. | 337/183 |
| 5,896,080 | A | * | 4/1999 | Chen | 337/407 |
| 5,933,310 | A | * | 8/1999 | Eggendorfer | 361/104 |
| 5,982,270 | A | * | 11/1999 | Wolfe et al. | 337/401 |
| 6,166,618 | A | | 12/2000 | Robertson | |

(Continued)

FOREIGN PATENT DOCUMENTS

| | | |
|---|---|---|
| GB | 1077035 A | 7/1967 |

*Primary Examiner*—Anatoly Vortman
(74) *Attorney, Agent, or Firm*—Martin J. Moran

(57) ABSTRACT

An electrical distribution device that includes a terminal for providing a connection to a first conductor, a spring mechanism having a first end that is electrically connected to the terminal, and a second conductor electrically connected to one or more internal components of the device. The spring mechanism has a first condition and a second condition. In the first condition, the second end is electrically connected to the second conductor by solder. When the solder melts, the spring mechanism moves from to the second condition in which the second end is no longer electrically connected to the second conductor, thereby protecting the internal components from the fault condition that lead to the overheating. A condition indicator may also be provided for indicating a fault condition.

10 Claims, 2 Drawing Sheets

U.S. PATENT DOCUMENTS

| | | | | |
|---|---|---|---|---|
| 6,204,747 | B1 * | 3/2001 | Kitchens | 337/407 |
| 6,342,827 | B1 * | 1/2002 | Buhrend et al. | 337/365 |
| 6,707,652 | B2 | 3/2004 | Engel | |
| 2005/0089079 | A1 | 4/2005 | Engel | |
| 2006/0273876 | A1 * | 12/2006 | Pachla et al. | 337/140 |

* cited by examiner

ELECTRICAL DISTRIBUTION DEVICE INCLUDING PROTECTION FOR OVERHEATING CONDITIONS

BACKGROUND OF THE INVENTION

1. Field of the Invention

The invention relates to electrical distribution devices and, more particularly, electrical distribution devices, such as, for example, receptacle outlets, wiring devices, wall, light or other power switches, lamp bases, extension cord outlet boxes, or wire union junction boxes, having an arrangement for protecting against overheating conditions.

2. Description of the Prior Art

Electrical connections, especially where wires are terminated (e.g., at outlets, switches, or other electrical distribution devices), are susceptible to overheating conditions that can potentially cause a fire. The overheating conditions can be caused by a number of conditions such as a loose, damaged or degraded connection between an electrical conductor and a terminal. A loose, damaged or degraded connection in and of itself may not be a hazard, but it is known that such connections can cause arcs when current is flowing and/or cause fretting of the electrical conductor. The arcing and/or fretting can lead to problems that result in overheating conditions, such as a glowing contact.

A glowing contact is a high resistance connection which can form at the interface of, for example, a copper wire and a screw terminal of, for example, a receptacle. The high resistance connection results from a build up of copper oxide that is produced during arcing and/or fretting at the interface. During a glowing contact fault in, for example, a receptacle, the copper wire reaches a glowing temperature value at which time the wire looks like an electric heater coil. First, the wire's insulation melts at the terminal. The melting then slowly progresses away from the terminal toward other wires in the receptacle's outlet box. The melting and decomposition of the plastic insulation from the wire and outlet can produce ignitable gasses (e.g., hydrogen, methane, ethane, ethylene, or acetylene) which can be ignited by an arc. Plastics and surrounding materials (wood, wallboard, etc.) may also be ignited solely from the high temperature produced from the glowing connection.

Furthermore, the current that flows both during and after the formation of a glowing contact is typically normal, since the voltage drop across a glowing contact, depending on the current, can range from 2 $V_{rms}$ to 10 $V_{rms}$, with the higher voltage level occurring at the lower current levels. The existence of a glowing contact, therefore, is not reliably detectable by a conventional upstream current protective device (e.g., a conventional circuit breaker or fuse).

It is thus desirable to be able to detect glowing contacts or other conditions that lead to overheating conditions and interrupt the current before the fault progresses to a hazardous condition.

SUMMARY OF THE INVENTION

The present invention relates to an electrical distribution device that includes a terminal, such as a screw, for providing an electrical connection to a first conductor, a spring mechanism, such as a piece of spring copper or other metal, having a first end that is electrically connected to the terminal and a second conductor electrically connected to one or more internal components of the electrical distribution device. The spring mechanism has a first condition and a second condition. In the first condition, the second end of the spring mechanism is electrically connected to the second conductor by solder. When the solder is caused to melt, such as by being exposed to overheating conditions (e.g., from a glowing contact or series arcing at the terminal) that exceed the melting point of the solder, the spring mechanism moves from the first condition to the second condition. In the second condition, the second end of the spring mechanism is no longer electrically connected to the second conductor, thereby protecting the internal components from the fault condition that lead to the overheating. This spring mechanism would preferably be present on all line and neutral conductor paths. In the example of the wall outlet, there would be four spring mechanisms since there are two plug receptacles present.

The electrical distribution device may further include a condition indicator for indicating that a fault condition has occurred. The condition indicator is operatively coupled to the second end of the spring mechanism. The condition indicator is caused to move to a fault indicating condition when the spring mechanism moves from the first condition to the second condition. Preferably, the condition indicator includes an indicator element such as a sliding element provided in a channel, operatively coupled to the second end of the spring mechanism that is movable from a first position to a second position, wherein the second position indicates a fault condition. The condition indicator may include a window through which the indicator element is visible when in the second position.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
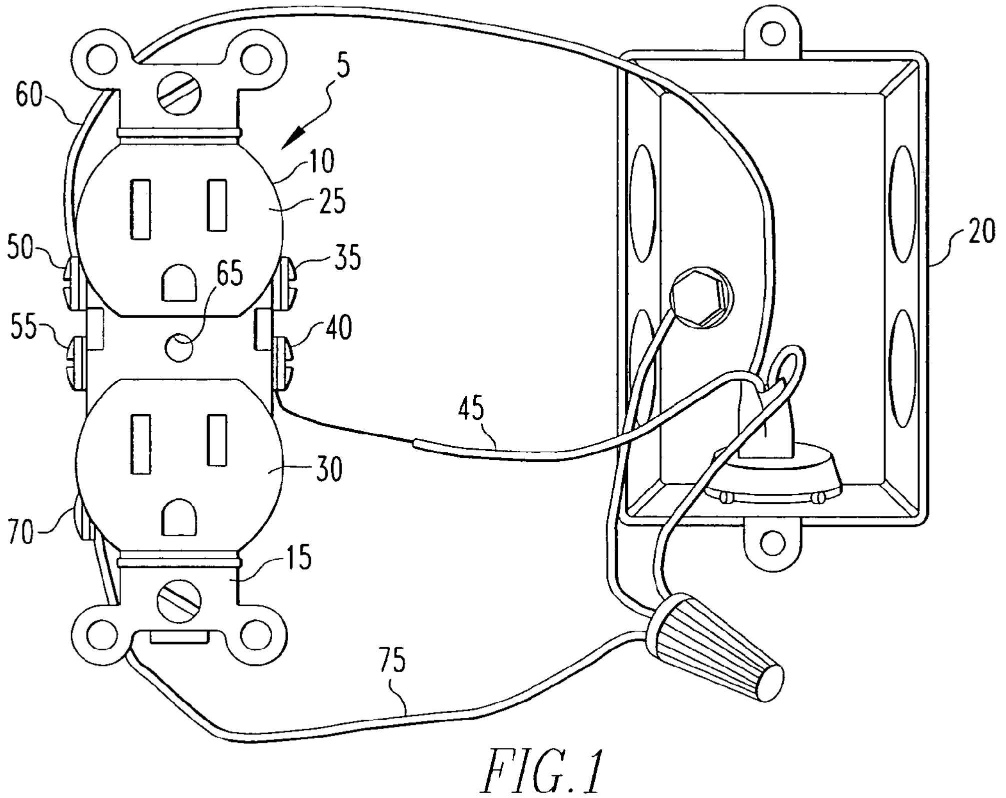
FIG. 1 is a front elevational view of a receptacle that includes an arrangement for protecting against overheating conditions, such as are caused by glowing contacts, according to the present invention.

FIG. 1 is a front elevational view of a receptacle 5 that includes an arrangement for protecting against overheating conditions, such as may be caused by a glowing contact or series arcing, according to the present invention. As will be appreciated, receptacle 5 includes many components of common prior art receptacles. For instance, receptacle 5 includes a body 10 consisting of a two-piece molding made of thermoplastic insulating material. The receptacle 5 also includes a conventional ground-mounting plate 15 for mounting the receptacle 5 in a conventional outlet box 20 and two conventional receptacle outlets 25 and 30. The receptacle 5 includes two screws 35 and 40 for electrically connecting a power line such as line wiring 45 and two screws 50 and 55 for electrically connecting a neutral line such as neutral wiring 60 of a conventional 120-volt AC power source. A threaded mounting bore 65 is adapted to receive a fastener, such as a screw, which is received through a mounting aperture of a cover plate (not shown) in order to fasten the cover plate to the receptacle 5. The receptacle 5 further includes a screw 70 for electrically connecting a ground line 75, which grounds the ground-mounting plate 15. Although screws 35, 40, 50, 55 and 70 are shown, any suitable connection or terminal (e.g., without limitation, compression terminals) may be employed.

Figure 2:
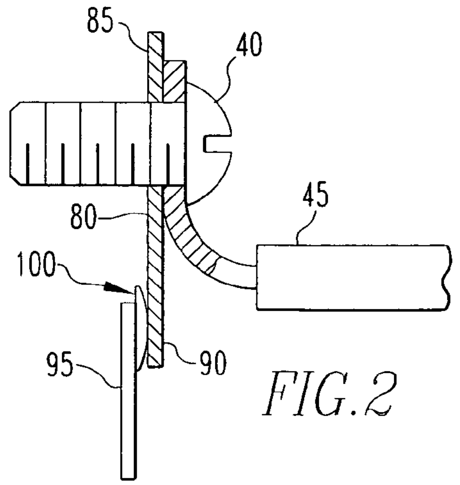
FIGS. 2 and 3 are schematic illustrations of the arrangement for protecting the receptacle from overheating conditions forming a part of the receptacle of FIG. 1.
Figure 3:
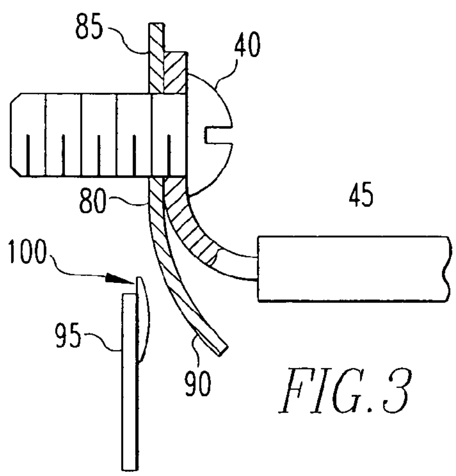

FIGS. 2 and 3 are schematic illustrations of an arrangement for protecting the receptacle 5 from overheating conditions, such as may be caused by a glowing contact or series arcing, according to the present invention. As seen in FIG. 2, a conductive spring mechanism 80, such as a piece of spring metal (e.g., spring copper) or other suitable conductive material, is attached to the screw 40 in a manner such that the spring mechanism 80 is electrically connected to the line wiring 45 at a first end of the spring mechanism 80. A second end 90 of the spring mechanism 80 is electrically and physically connected to conductor 95 by solder 100. Conductor 95 leads to the internal components of the receptacle 5. As is known, solder 100 will have a particular melting temperature depending on the specific type of solder used for solder 100. The use of screw 40 in FIGS. 2 and 3 is meant to be exemplary only, and it will be appreciated that the arrangement of the present invention may also be used with any combination of the screws 35, 40, 50 and 55 (and the associated wiring such as neutral wiring 60), or other suitable terminals. In the preferred embodiment, the arrangement of FIGS. 2 and 3 is used with each of the screws 35, 40, 50 and 55 (and the associated wiring).

Under normal operating conditions, the arrangement appears as shown in FIG. 2 such that the line wiring 45 is electrically connected to the conductor 95 (through the solder 100), and therefore the internal components of the receptacle 5. Spring mechanism 80, being made of a conductive material, will conduct heat. Thus, when the temperature at or near the junction of the screw 40, the line wiring 45 and the first end 85 of the spring mechanism 80 becomes elevated, such as during overheating conditions caused by, for example, a glowing contact or series arcing, the heat that is generated will be conducted by spring mechanism 80 to the second end 90 of the spring mechanism 80. When the temperature at the second end 90 of the spring mechanism 80 is high enough, i.e., above the melting point of the solder 100, the solder 100 will melt, thereby causing spring mechanism 80, and in particular the second end 90 thereof, to move away from the conductor 95 under the spring tension as shown in FIG. 3. As a result, the electrical connection between the second end 90 of the spring mechanism 80 (and thus the line wiring 45) and the conductor 95 will be broken, thereby isolating the internal components of the receptacle 5 and protecting them from the overheating conditions.

As noted above, the particular melting point of solder 100 will depend on the particular solder that is chosen. In addition, the time between the initiation of an overheating condition, e.g., the initiation of a glowing contact, and the opening of the connection the second end 90 of the spring mechanism 80 and the conductor 95 will depend on the particular melting point of the solder 100. Thus, that time period can be controlled, for a given current, by the type of solder that is chosen for solder 100. The lower the melting point of the solder chosen for solder 100, the more sensitive it will be to a temperature rise and the more quickly it will melt following the initiation of the overheating condition, resulting in the separation of the second end 90 of the spring mechanism 80 and the conductor 95. As will be appreciated, care should be taken in choosing a solder for solder 100, as too low a melting point will cause the solder to melt (and therefore allow the second end 90 of the spring mechanism 80 to separate from the conductor 95) as a result of the heat generated under normal operating conditions, particularly in applications having high ambient conditions.

A number of commercially available lead based solders that may be used for solder 100 and their corresponding melting points are shown in Table 1 below.

| Solder Type | Melting Point (° C.) |
|---|---|
| Cerrobend | 70 |
| Cerrosafe | 71-88 |
| Cerroshield | 95 |
| Cerromatrix | 103-227 |
| Cerrobase | 124 |
| Cerrotru | 138 |
| Cerrolow-117 | 47 |
| Cerrolow-136 | 58 |
| Cerrolow-140 | 57-65 |
| Cerrolow-147 | 61-65 |
| Cerroseal Wire | 116-127 |
| Roses metal | 95-110 |
| Woods metal | 70 |
| Pb/Sn 60/40 | 188 |
| Indalloy #117 | 47 |
| Indalloy #136 | 58 |
| Indalloy #158 | 70 |
| Indalloy #42 | 96 |
| Indalloy #255 | 124 |
| Indalloy #181 | 145 |
| Indalloy #2 | 154 |
| Indalloy #97 | 163 |
| Indalloy #9 | 167 |
| Indalloy #204 | 175 |
| Sn62 | 179 |

In light of new environmental regulations, it may be desirable or necessary to use a lead free solder for solder 100. A number of commercially available lead free solders that may be used for solder 100 and their corresponding melting points are shown in Table 2 below.

| Solder Type | Melting Point (° C.) |
|---|---|
| Indalloy #19 | 60 |
| Indalloy #162 | 72 |
| Indalloy #174 | 79 |
| Indalloy #8 | 93 |
| Indalloy #224 | 108 |
| Indalloy #1 | 118 |
| Cerrocast | 138-170 |
| Indalloy #281 | 138 |
| Indalloy #290 | 143 |
| Indalloy #4 | 157 |
| Indalloy #133 | 240 |
| Indalloy #3 | 247 |

Figure 4:
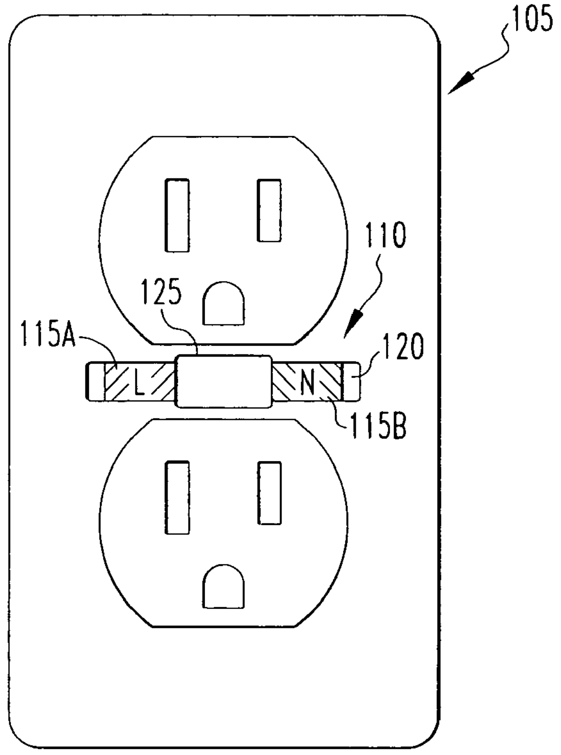
FIG. 4 is a front elevational view of a receptacle having a condition indicator according to a further aspect of the present invention.

FIG. 4 is a front elevational view of a receptacle 105 having a condition indicator 110 according to a further aspect of the present invention. The receptacle 105 is similar to the receptacle 5 shown in FIG. I and includes at least a line terminal (e.g., screw 40) and a neutral terminal (e.g., screw 50), each one of which is provided with an arrangement as shown in FIGS. 2 and 3 (not shown in FIG. 4). The condition indicator 110 is able to indicate whether a line or neutral fault condition exists inside of the receptacle 105 as a result of the separation of the second end 90 of the spring mechanism 80 and the conductor 95 for a particular terminal (line or neutral terminal).

The condition indicator 110 includes sliding elements 115A and 115B that are slideably mounted within a channel 120 provided on the front face of the receptacle 105. The condition indicator 110 further includes a window 125, preferably made of a colored, transparent or translucent material such as a colored (e.g., red) plastic. The channel may be covered so that the sliding elements 115A and 115B are not visible except through the window 125 as described below.

Figure 5:
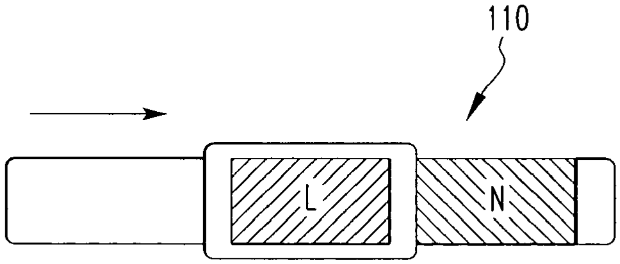
FIGS. 5 and 6 are schematic representations showing the operation of the condition indicator of FIG. 4.
Figure 6:
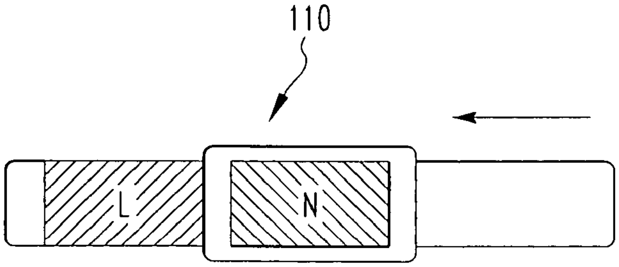

As seen in FIG. 4, the sliding element 115A is provided with the letter "L" thereon to indicate load. The sliding element 115A is coupled, such as through a rod or lever mechanism, to the spring mechanism 80 attached to the load terminal of the receptacle 105 so that, when the spring mechanism 80 is caused to separate from the associated conductor 95, it will in turn cause the sliding element 115A to move to the right as shown in FIG. 5 and within the window 125. The presence of the sliding element 115A within the window 125 will indicate that a load fault has occurred. Similarly, the sliding element 115B is provided with the letter "N" thereon to indicate neutral. The sliding element 115B is coupled, such as through a rod or lever mechanism, to the spring mechanism 80 attached to the neutral terminal of the receptacle 105 so that, when the spring mechanism 80 is caused to separate from the associated conductor 95, it will in turn cause the sliding element 115B to move to the left as shown in FIG. 6 and within the window 125. The presence of the sliding element 115B within the window 125 will indicate that a neutral fault has occurred.

While specific embodiments of the invention have been described in detail, it will be appreciated by those skilled in the art that various modifications and alternatives to those details could be developed in light of the overall teachings of the disclosure. For example, while the arrangement shown in FIGS. 2 and 3 is described in connection with the receptacle 5, it may be used in the terminals of other electrical distribution devices, such as, for example, receptacle outlets, wiring devices, wall, light or other power switches, lamp bases, extension cord outlet boxes, or wire union junction boxes. Accordingly, the particular arrangements disclosed are meant to be illustrative only and not limiting as to the scope of the invention which is to be given the full breadth of the claims appended and any and all equivalents thereof.

What is claimed is:

1. An electrical distribution device, comprising:

a terminal for providing an electrical connection to a first conductor;

a spring mechanism having a first end and a second end, said first end being electrically connected to said terminal;

a second conductor electrically connected to one or more internal components of the electrical distribution device; and a condition indicator having an indicator element and a window, said indicator element being operatively coupled to said second end of said spring mechanism, said indicator element being movable from a first position to a second position, said indicator element being visible through said window in said second position and said second position indicating a fault condition;

wherein said spring mechanism has a first condition and a second condition, wherein in said first condition said second end of said spring mechanism is electrically connected to said second conductor by solder, wherein said spring mechanism moves from said first condition to said second condition when said solder is caused to melt, wherein in said second condition said second end of said spring mechanism is not electrically connected to said second conductor, and wherein said indicator element is caused to move to said second position when said spring mechanism moves from said first condition to said second condition.

2. The electrical distribution device according to claim 1, said indicator element being visible through said window only in said second position, said indicator element not being visible from outside of said electrical distribution device in said first position.

3. The electrical distribution device according to claim 1, wherein said condition indicator includes a channel, wherein said indicator element is a sliding element slideable within said channel, and wherein said indicator element moves from said first position to said second position by sliding within said channel.

4. The electrical distribution device according to claim 2, wherein said indicator element includes one of the letter "L" and the letter "N" thereon.

5. The electrical distribution device according to claim 1, wherein said terminal is a screw.

6. The electrical distribution device according to claim 1, wherein said spring mechanism is a piece of spring metal.

7. The electrical distribution device according to claim 1, wherein said solder is a lead based solder.

8. The electrical distribution device according to claim 1, wherein said solder is a lead free solder.

9. The electrical distribution device according to claim 1, wherein said terminal is a load terminal.

10. The electrical distribution device according to claim 1, wherein said terminal is a neutral terminal.

* * * * *